(12) United States Patent
Dobson et al.

(10) Patent No.: US 6,256,628 B1
(45) Date of Patent: Jul. 3, 2001

(54) DATA CHARTING

(75) Inventors: Adam Alexander Dobson, Benfleet; Roland Albert Merrick, Evesham, both of (GB)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 09/103,767

(22) Filed: Jun. 24, 1998

(30) Foreign Application Priority Data

Aug. 22, 1997 (GB) .................................................. 9717737

(51) Int. Cl.[7] ...................................................... G06F 17/30
(52) U.S. Cl. ................................. 707/6; 707/101; 706/10; 706/62; 345/339; 345/440; 345/24; 704/200
(58) Field of Search ........................ 707/101, 6; 345/440, 345/339, 437, 24; 701/207; 706/62, 10; 704/200

(56) References Cited

U.S. PATENT DOCUMENTS

| | | | |
|---|---|---|---|
| 4,393,448 | * 7/1983 | Dunn et al. | 701/207 |
| 4,677,571 | * 6/1987 | Riseman et al. | 395/109 |
| 5,263,120 | * 11/1993 | Bickel | 706/62 |
| 5,844,572 | * 12/1998 | Schott | 345/440 |
| 5,910,801 | * 6/1999 | Rosenburg et al. | 345/339 |
| 5,940,825 | * 8/1999 | Castelli et al. | 707/6 |
| 5,977,890 | * 11/1999 | Rigoutsos et al. | 341/55 |
| 5,986,673 | * 11/1999 | Martz | 345/437 |

OTHER PUBLICATIONS

Peter Lynch, "Beating the Street", 1993, Simon & Schuster, pp. 66–67.
J.A. Hartigan, Statistical Theory in Clustering, Journal of Classification, 2:63–76 (1985).
Charles T. Zahn, Graph–Theoretical Methods for Detecting and Describing Gestalt Clusters, IEEE Transactions on Computers, vol. C–20, No. 1, Jan. 1971, pp. 68–86.
J.C. Gower and G.J.S. Ross, Minimum Spanning Trees and Single Linkage Cluster Analysis, Rothamsted Experimental Station, pp. 54–63.

* cited by examiner

*Primary Examiner*—Hosain T. Alam
*Assistant Examiner*—Jean M. Corrielus
(74) *Attorney, Agent, or Firm*—Sughrue, Mion, Zinn, Macpeak & Seas, PLLC

(57) ABSTRACT

A method of displaying clustered data points in detail and in context within a data set. The method includes the step of identifying one or more clustered sets of data points within a data set. The data set includes a plurality of data points. The method also includes the steps of determining a respective data range segment for each cluster of data points, where each data range segment has a boundary and a scale interval, and displaying the data points in each segment such that each segment is mutually distinguishable. Where two or more data range segments are determined, the scale interval value for one of the data range segments is modifiable to differ from one or more of the other data range segments.

14 Claims, 2 Drawing Sheets

DATA CHARTING

BACKGROUND OF THE INVENTION

The present invention relates in general to a method of charting data. More particularly, the present invention is directed to a method of charting data and determining an optimum range for display of the data.

Conventional methods of data charting typically include axis based charting of data points, where a data point is displayed in relation to one or two axes with associated scale values. A scale is associated with a chart axis in order to provide the mapping of data values to coordinates on a computer output device such as a display or printer. The simplest form of scale representation is a linear progression at a regular interval ranging from a minimum to a maximum value. This form is suitable for the charting of data points that are fairly evenly distributed across a scale range.

A refinement of the linear scale is the logarithmic scale, where interval values are progressively compressed on the scale as the magnitude gets higher. This is suitable for charting data where the majority of data points are clustered toward the lower end of the scale range, but some data points are significantly greater in magnitude. In this case, a simple linear scale compresses the majority of data points such that visually distinguishing between the points becomes difficult.

Where data point clustering occurs away from the extremities of the scale range, or where multiple distinct clusters appear, the above techniques do not offer a solution to the problem of displaying and examining in detail the clustered values. A few conventional solutions exclude the extremities of the scale range from the displayed scale range and expand the portion of the scale range pertaining to clustered data values. However, this technique loses the context of the clustered data within the overall data set, and does not address the situation where more than one clustered set of data points exist.

SUMMARY OF THE INVENTION

It is therefore an object of the present invention to provide a method, employing multiple data range segments on an axis, to allow for selective detailed display of one or more clustered sets of data points, while retaining the context of each data cluster within a data set.

Accordingly, the present invention provides a method of displaying clustered data points in detail and in context within a data set including the following steps: identifying one or more clustered sets of data points within a data set, each data set including a plurality of data points, determining respective data range segments each cluster of data points, and displaying the data points in each segment such that each segment is mutually distinguishable.

Preferably, the determining step determines two or more data range segments. The scale interval value for one of said data range segments is modifiable to differ from one or more of said other data range segments.

Preferably, the identifying and determining steps include, in response to user interaction, determining one or more data range segments relating to data clusters following visual data cluster identification by the user.

The method also includes the step of: in response to user interaction, adjusting existing data range segments.

The invention is particularly useful in, for example, viewing charts showing CPU utilization over time. In such a case, important data points are often compressed into an area occupying as little as 15% of the utilization axis of the chart. Conventionally, the only option to examine the area in detail is to fill the display with the data. Although it is common for charting packages to allow such a display of only part of the data range, the ability to see the critical portion within context is also important.

This invention is also useful for Internet World Wide Web page providers who wish to display data, such as stock price movements over time, where the detail of price movement over a relatively long time swamps the detail of rapid price movements. The present invention allows such page providers to show detailed movements and allows user exploration of data without the need to subset data through, for example, query type user interaction.

DETAILED DESCRIPTION OF THE INVENTION

Figure 1:
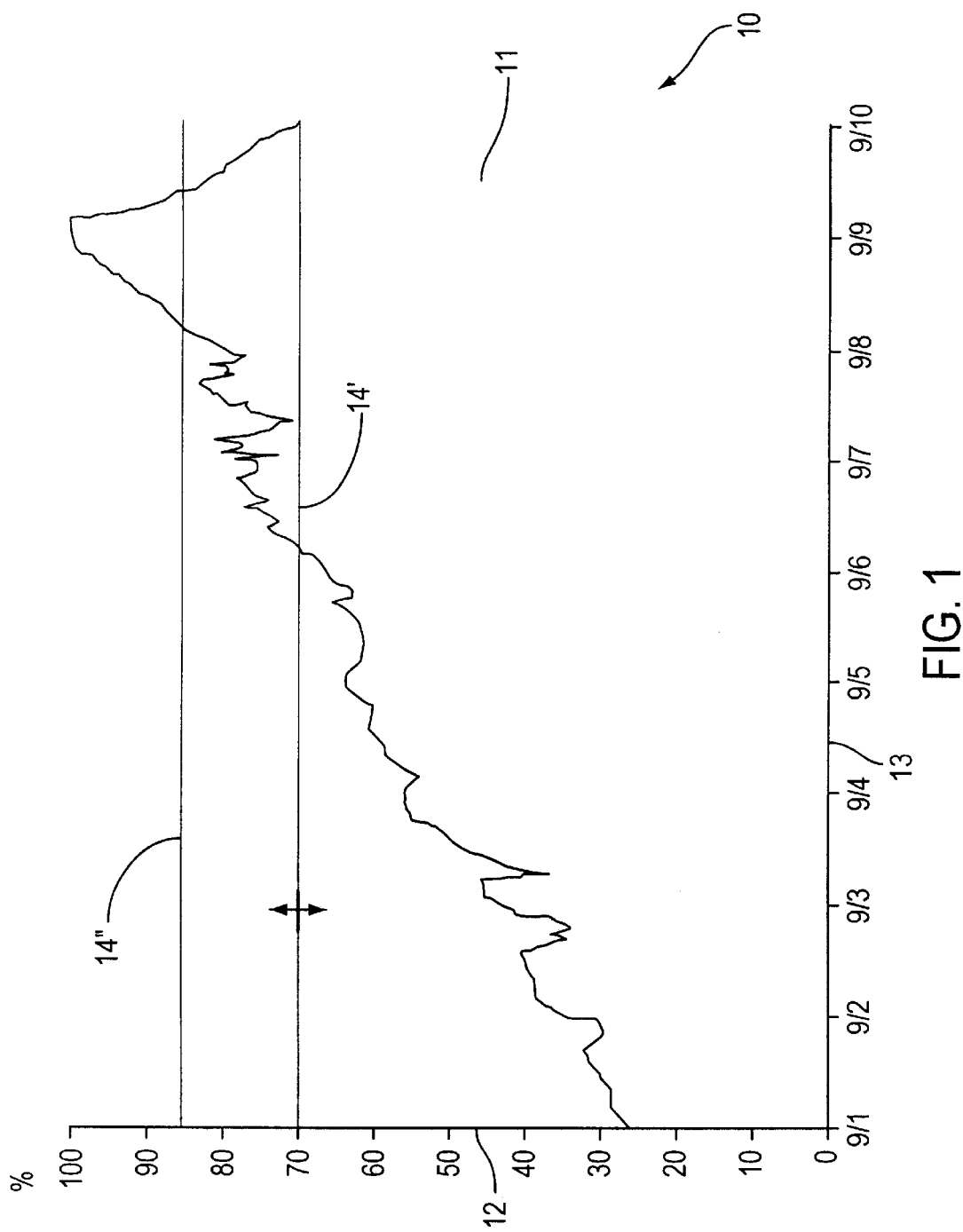
FIG. 1 is a diagram illustrating an initial data display according to the present invention.

According to a preferred embodiment of the invention, there is provided a method for a) defining contiguous data range segments having scales that provide differing mappings of data points to an axis of a chart, b) for representing these mappings, and c) for allowing user definition and adjustment of these mappings.

Defining Data Range Segments

The analysis and identification of data clusters within a data set are techniques well known in the art, and is not central to this invention. Such techniques are described in, for example, the following references: J. C. Gower and G. J. S. Ross—"Minimal spanning trees and single linkage cluster analysis. Applied Statistics", 18:54–64, 1969; C. T. Zahn—"Graph-theoretical methods for detecting and describing gestalt clusters", IEEE Transactions on Computers, C 20(1):68–861, January 1971; J. A. Hartigan—"Statistical theory in clustering", Journal of Classification, 2:63–76, 1985.

Once determined, a scale, preferably linear, associated with a respective data range segment, is associated with a segment of the total axis range. The identification of segments may be done in a number of ways, for example:

by the user, via the user interface, as explained below;
   algorithmically, by employing previously referred to cluster analysis, and association of a cluster with a visual segment; or
   segments may be pre-defined, based upon critical data points which data may or may not exhibit, e.g., CPU utilization could be split into three segments, 0–70%—acceptable, 70–85%—warning, 85–100%—action required.

The result of this analysis is preferably a set of contiguous linear scales that together map the total data space to the total available axis space.

Representing Mappings

A common approach of representing a scale on an axis is to display scale values against significant increments along the axis. For a simple linear scale this is straightforward; for multi-linear scales, however, the varying distribution of scale values according to the scale interval requires a varying definition of significant increments, to avoid over crowding of scale values on dense scale segments.

To visually distinguish between adjacent data range segments, the chart background color and/or the data value representation (points, lines, bars, etc) within each data range segment are set. Coloring the data value representations works well with a single data set, but is less effective where multiple data sets already employ color as a distinguishing factor. Coloring the chart background works well with single or multiple data sets. Discrete colors may be arbitrarily chosen, or a scheme of related colors varying according to scale density may be used. For example, the background color of a chart may be darker the higher the density of the associated scale segment.

Further distinctions between adjacent data range segments may be achieved by drawing a line at the extremities of each segment.

Interactive User Definition and Adjustment of Mappings

When a chart is displayed, a user may interactively adjust existing data range segments, or define new data range segments. Adjustments may include deletion (in other words remove the special treatment of a data cluster), varying a data range segment scale interval, varying a data segment range, or setting of data range segment scale attributes.

User interaction techniques are therefore provided for:

1. Defining a new data range segment;
2. Deleting a data range segment;
3. Adjusting the amount of display (density) assigned to a data range segment; and
4. Adjusting the range of a data range segment.

This is best understood by looking at an example. Referring to FIG. 1, a chart 10 includes three main components: the main data display area 11, the vertical axis 12 and the horizontal axis 13. Display of the two axes is optional, but when present they are controlled by a chart program, so that whenever a scale segment boundary 14',14" is modified, added or removed, the axes stay up to date. Each data range segment boundary has two values associated with it—the value in scale coordinates and the proportion of the way up the display it is (i.e., the display position). The scale interval or density between any two segment boundaries can be calculated as required. For example, the display position for the line 14' would be 0.70 in FIG. 1 and about 0.25 in FIG. 2. There are always two permanent invisible data range segment boundaries which cannot be modified and which are positioned at the top and bottom of the data range with display positions of 1.0 and 0.0 respectively.

To decide where to display each boundary on the screen a simple calculation is performed. Given the display height in screen coordinates (-dh), the display minimum in screen coordinates (-dm), and the display position of the boundary between 0.0 and 1.0-dp, the screen location of the boundary can be calculated by the equation:

$$(dh*dp)+dm \qquad (1)$$

The data points to be displayed can be positioned by interpolating between the data range segment boundaries above and below the point. The present embodiment is implemented in Java, and the chart program provides conventional methods to obtain the screen coordinates for a specific data value and to obtain the data value for a screen coordinate, to ensure the scale lines up exactly with the chart.

If data points are joined by lines, some extra calculations are required because lines which cross segment boundaries 14', 14" will not be straight, unless the segments have equal stretch amounts. Therefore, to display lines in different segments with different stretch values or colors, it is necessary to split the lines which cross segment boundaries into several smaller lines, one per segment. This is achieved using a conventional line clipping algorithm applied to the segment boundaries.

In the present embodiment, a new segment boundary is created by clicking on the appropriate x or y axis with the right mouse button which triggers a popup menu. A split scale option is selected from this menu which splits the scale at that point without affecting data range segment densities.

Correspondingly, a data range segment boundary is removed by clicking on the appropriate boundary with the right mouse button which triggers a popup menu. A join scale option is selected from this menu which joins the scale at that point and will affect adjacent segment densities if they are not equal.

Figure 2:
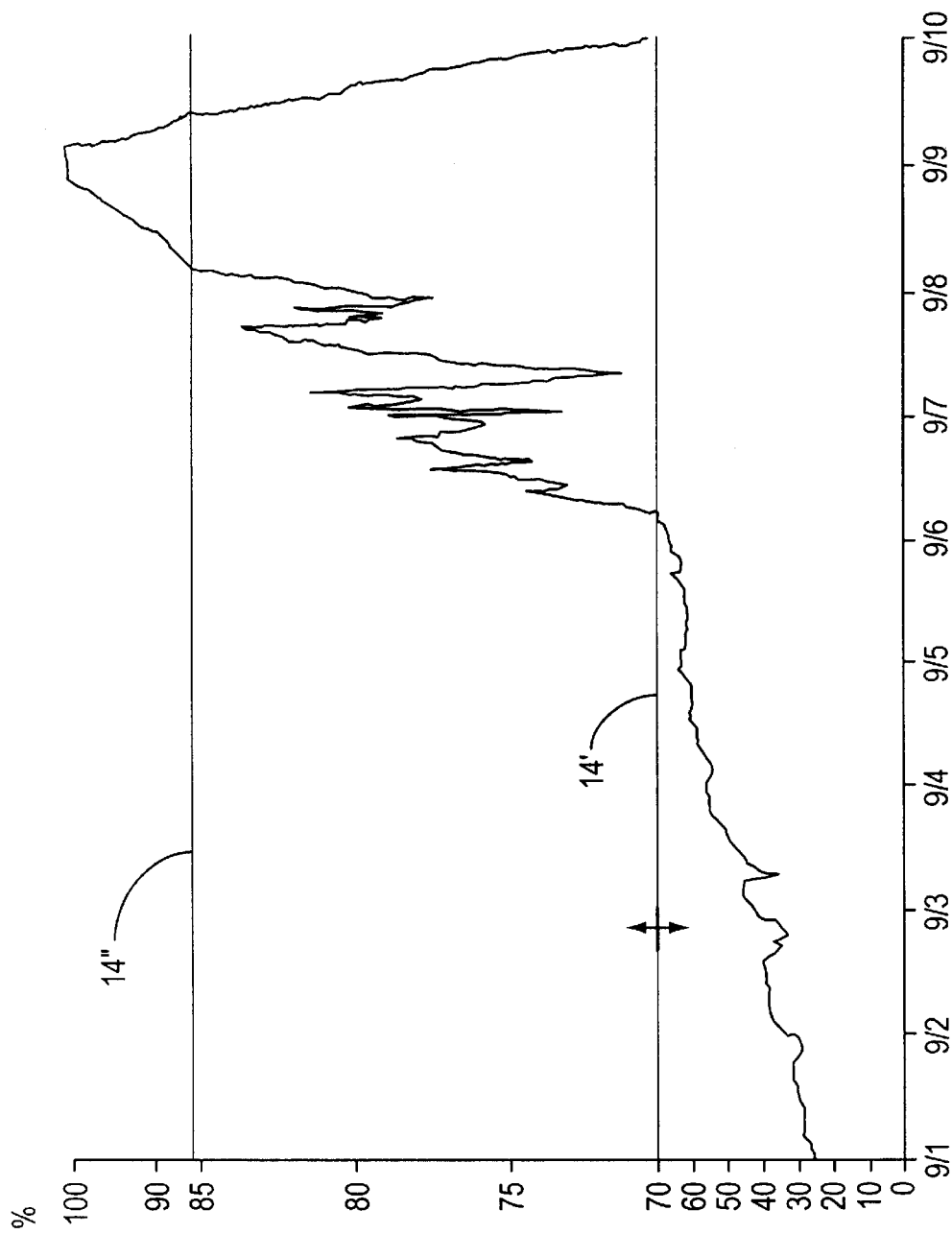
FIG. 2 is a diagram illustrating an adjusted data display according to the present invention.

An existing segment can be adjusted in many ways, such as:

Click and drag on a segment boundary—in this case, the boundary value in scale coordinates remains the same, as per the transition from FIG. 1 to FIG. 2. Thus, the density of one segment is increased and the density of the segment sharing this boundary is decreased or vice versa according to the direction of movement.

Click, shift and drag on a segment boundary—in this case, the boundary value in scale coordinates changes, so that the density of one segment can stay the same with some adjustment required to the density of an adjacent segment.

Delete and recreate the upper or lower segment boundary—this takes two segments which may have had different densities and makes two segments of equal density separated by the newly created boundary which can be subsequently adjusted as above.

Click and drag within the segment—this moves an entire data range segment up or down within the overall chart. This causes one adjacent segment to get denser and another to get less dense according to the direction of movement. It has been found that it is not practical to move the bottom or top segments as they must start and finish at display positions 0.0 and 1.0, respectively.

Click on the segment with the right mouse button to trigger a popup menu, select a properties option from this menu which brings up a dialog which allows modification of the segment density. Changing the segment density while retaining its range will cause changes to one or both of the segments adjacent the adjusted segment.

Click on the appropriate segment with the right mouse button which triggers a popup menu, select the properties option from this menu which brings up a dialog which allows modification of the segment range.

In any case, the display of data points within segments affected by any of the above adjustments will need to be refreshed. In the case of mouse driven adjustments, the refresh is carried out repeatedly as the mouse drags a segment boundary, or in the case of dialog driven adjustments, the refresh is carried out once the dialog is complete.

The example shown in FIGS. 1 and 2 illustrates the definition of a data range segment having a y axis boundary. The invention is, however, not limited to data range segment definition on one axis, and may be employed to define one or more data range segments on one or both axes.

One of ordinary skill in the art will readily recognize that the present invention can be embodied in many formats. The invention can be:

a. included in a dedicated charting package where data is supplied directly by a user to the package;
b. sold as a charting utility for operation with independent applications, for example, a spreadsheet;

c. written as a Java bean including: methods, supplied from elsewhere in a Java environment with a set of data points, for calculating data point display positions; methods for displaying the data points on a chart; methods responsive to user interaction for defining new data range segments; and/or methods for automatically determining one or more data clusters from the set of data points.

It will also be seen that the term data points can be interpreted more broadly than a simple set of (x, y) coordinates. The invention can be applied to any chart type display where a user wishes to define a range around a region containing data of interest, yet retaining the context of the data. For example, the invention could be applied to a map display, where the user may wish to expand the map scale, on either axis, around a city, while keeping the context of the city within its country.

What is claimed is:

1. A method of displaying clustered data points within a data set comprising the steps of:

identifying a plurality of clustered sets of data points within a data set, each of said data sets comprising a plurality of data points;

determining a respective data range segment for each of said plurality of clustered sets of data points, each data range segment having a boundary and a scale interval, the scale interval corresponding to a scale at which the respective data range segment is displayed, wherein the scale interval for one of said data range segments is modifiable to differ from the scale intervals of one or more of other of said data range segments; and displaying the data points in each segment such that each segment is mutually distinguishable.

2. The method as defined in claim 1, wherein said identifying and determining steps are initially carried out automatically according to control parameters supplied by a user.

3. The method as defined in claim 1, wherein said identifying and determining steps comprise, in response to user interaction, determining one or more data range segments relating to data clusters following visual data cluster identification by said user.

4. The method as defined in claim 3, wherein said data points are displayed on a chart, said chart comprising a data point display area, a vertical axis and a horizontal axis.

5. The method as defined in claim 4, wherein, in response to a user actuating a user input device at a point on an axis within a data range segment, a popup menu is displayed, said menu having a split scale option selectable by said user, and in response to said user selecting said option, said data range segment is split into two contiguous segments.

6. The method as defined in claim 4, wherein response to a user actuating a user input device on an axis at a boundary adjoining two data range segments, a popup menu is displayed, said menu having a join scale option selectable by said user, and in response to said user selecting said option, said data range segments being joined into a single data range segment.

7. The method as defined in claim 1, comprising the step of: adjusting existing data range segments in response to user interaction.

8. The method as defined in claim 7, wherein response to a user first actuating a user input device on a data range segment boundary, a data range segment is adjusted by further actuating the device to locate the boundary at a required location.

9. The method as defined in claim 8, wherein a boundary has a display position and an associated scale value, and in response to said further device actuation, adjusting said scale value such that the scale interval of a segment adjacent said boundary is maintained.

10. The method as defined in claim 8, wherein a boundary has a display position and an associated scale value, and in response to said further device actuation, maintaining said scale value such that the scale interval of a segment adjacent said boundary is adjusted.

11. The method as defined in claim 1, wherein the data range segments are contiguous.

12. The method as defined in claim 1, wherein each data range segment is linear.

13. The method as defined in claim 1, wherein displayed data points are connected by lines, and the method further comprises the step of:

applying a line clipping algorithm to said lines, to prevent lines crossing data range segment boundaries.

14. A computer system comprising a processing unit connected to one or more user input devices, a monitor and a data store, said system comprising a computer software component responsive to user interaction via at least one of said input devices and receptive to a data set supplied from said data store, said software component being adapted to display said data points from said data set on said monitor according to a method comprising the steps of:

identifying one or more clustered sets of data points within a data set, said data set comprising a plurality of data points;

determining a respective data range segment for each of said plurality of clustered sets of data points, each data range segment having a boundary and a scale interval, the scale interval corresponding to a scale at which the respective data range segment is displayed, wherein the scale interval for one of said data range segments is modifiable to differ from the scale intervals of one or more of other of said data range segments; and displaying the data points in each segment such that each segment is mutually distinguishable.

* * * * *